United States Patent [19]
Hirai et al.

[11] Patent Number: 5,945,185
[45] Date of Patent: Aug. 31, 1999

[54] AIR BAG MADE OF SILICONE MODIFIED THERMOPLASTIC POLYURETHANE RESIN

[75] Inventors: Kinji Hirai, Kawasaki; Masahiko Minemura, Matsuida-machi; Yoshitaka Koshiro, Tokyo; Susumu Nakamura, Tokyo; Kazuyuki Hanada, Tokyo, all of Japan

[73] Assignees: Takata Corporation; Shin-Etsu Chemical Co., Ltd.; Dainichiseika Color & Chemicals Mfg. Co., Ltd., all of Tokyo, Japan

[21] Appl. No.: 09/094,641

[22] Filed: Jun. 15, 1998

[30] Foreign Application Priority Data

Jul. 14, 1997 [JP] Japan .................................. 9-188314

[51] Int. Cl.⁶ .......................... B60R 21/16; B60R 21/20; B29D 22/00; B29D 23/00
[52] U.S. Cl. ................. 428/35.2; 280/728.1; 280/743.1; 428/35.5
[58] Field of Search .................................. 428/35.2, 35.5; 280/728.1, 743.1

[56] References Cited

U.S. PATENT DOCUMENTS 5,441,771  8/1995  Seltmann et al. .
5,514,431  5/1996  Shimomura ............................ 428/35.3

FOREIGN PATENT DOCUMENTS

| 0 431 881 | 6/1991 | European Pat. Off. . |
| 44 23 937 | 1/1996 | Germany . |
| 54-131661 | 10/1979 | Japan . |
| 56-16553 | 2/1981 | Japan . |
| 63-78744 | 4/1988 | Japan . |
| 2-270654 | 11/1990 | Japan . |
| 4-266544 | 9/1992 | Japan . |
| 5-98579 | 4/1993 | Japan . |
| 2 251 253 | 7/1992 | United Kingdom . |

Primary Examiner—Patrick D. Niland
Attorney, Agent, or Firm—Kanesaka & Takeuchi

[57] ABSTRACT

An air bag made of thermoplastic polyurethane resin which can be deployed quickly enough over a wide range of temperature from very low to high and which can exhibit stable performance without danger of blocking is made of silicone modified thermoplastic polyurethane resin in which the content of siloxane is 5–40% by weight. An occupant can be protected by the air bag over a wide range of temperature such as from −40° C. to +100° C.

8 Claims, No Drawings

AIR BAG MADE OF SILICONE MODIFIED THERMOPLASTIC POLYURETHANE RESIN

FIELD OF THE INVENTION

The present invention relates to an air bag of an air bag device installed in a vehicle for protecting an occupant in the event of a vehicle collision, and more particularly to a high-performance air bag made of silicone modified thermoplastic polyurethane resin.

BACKGROUND OF THE INVENTION

A driver-side air bag device, which is installed in the center of a steering wheel, comprises a retainer, an air bag attached to the retainer, a gas generator (inflator) for deploying the air bag, and a module cover covering the air bag. Once a vehicle comes into collision, the inflator generates gases so that the air bag tears the module cover and is developed into a cabin of the vehicle.

A passenger-side air bag device which is installed in an instrument panel comprises a container, an air bag and an inflator which are mounted to the container, and a module cover attached in such a manner as to cover an opening of the container. Such a module cover is also sometimes called as a lid or a deployment door. In the event of a vehicle collision, the inflator operates to deploy the air bag and the module cover is pushed by the deployed air bag to open into a cabin so that the air bag is deployed widely.

The air bags are made of cloth. An air bag made by coating silicone rubber on textile of synthetic fiber such as polyester and polyamide is disclosed in JPA 63-78744 and JPA 2-270654. An air bag made by coating silicone emulsion composite or silicone latex composite as a treating composite which does not contain organic solvent in terms of working surroundings on the textile is described in JPA 56-16553, JPA 54-131661, JPA 5-98579, and U.S. Pat. No. 3,817,894.

These air bags are insufficient for the adhesion between the textile and the coating fluid, because coatings are applied to textile of synthetic fiber as to all of them. The air bags need measures, such as sticking tape made of rubber or silicone rubber on a sew-made part, to add the tearing strength and also improve the gastightness of the sew-made part. The air bags take long time to be sewed so that they are economically disadvantageous.

An air bag made of thermoplastic elastomer such as thermoplastic polyurethane disclosed in JPA 4-266544 are capable of fusing by heat so that they are advantageous over the conventional air bags made by coating rubber on textile of synthetic fiber and sewing in that sewing is not necessary.

However the air bag made of thermoplastic elastomer does not always expand quickly over a wide range of temperature, i.e. from very low temperature to high temperature (for example, from −40° C. to +100° C.)

An air bag is accommodated in the folded state in an air bag device, so that a sheet of the air bag made of a certain material sometimes adhere to each other at a portion where the sheets are in contact, resultiny that the portions will remain folded or will be broken due to tackiness or blocking thereof when the air bag expands.

OBJECT AND SUMMARY OF THE INVENTION

It is an object of the present invention to provide an air bag made of thermoplastic polyurethane resin which can be deployed quickly enough over a wide range of temperature from very low to high and which can exhibit stable performance without tackiness or blocking.

An air bag made of silicone modified thermoplastic polyurethane resin of the present invention is made of a silicone modified thermoplastic polyurethane resin that contains polysiloxane segment and is characterized in that the content of siloxane of polysiloxane segment is 5–40% by weight.

The silicone modified thermoplastic polyurethane resin in which the content of siloxane is 5–40% by weight can exhibit stable performance over a wide range of temperature.

In the present invention, the silicone modified thermoplastic polyurethane resin is preferably the one that is obtained by reacting polyol, polyisocyanate, polysiloxane, and, if necessary, chain extender and the polysiloxane is preferably polysiloxane including active hydrogen as represented by the following general formula (I);

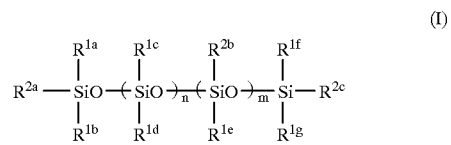

(In the above formula (I), $R^{1a}$, $R^{1b}$, $R^{1c}$, $R^{1d}$, $R^{1e}$, $R^{1f}$, $R^{1g}$, $R^{2a}$, $R^{2b}$, $R^{2c}$, m, and n are as follows:

$R^{1a}$–$R^{1g}$: aryl or alkyl groups each including 1–8 carbon(s), $R^{1a}$–$R^{1g}$ being independent of each other;

$R^{2a}$–$R^{2c}$: substituents each including active hydrogen, or aryl or alkyl groups each including 1–8 carbon(s), $R^{2a}$–$R^{2c}$ being independent of each other, and at least one of $R^{2a}$–$R^{2c}$ being the substituent including active hydrogen;

m: integer between 0 and 2;

n: integer between 5 and 200.)

It is desirable that polysiloxane according to the present invention is polysiloxane diol, preferably a copolymer of polysiloxane including active hydrogen and caprolactone, or a copolymer of carboxylic acid modified polysiloxane and diol, represented by the following general formula (II), (III), or (IV).

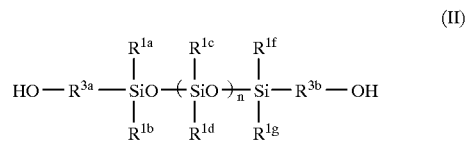

(In the above formula (II), $R^{1a}$, $R^{1b}$, $R^{1c}$, $R^{1d}$, $R^{1f}$, $R^{1g}$, $R^{3a}$, $R^{3b}$, and n are as follows.

$R^{1a}$–$R^{1d}$, $R^{1f}$, $R^{1g}$: alkyl or aryl groups each including 1–8 carbon(s), $R^{1a}$–$R^{1d}$, $R^{1f}$, $R^{1g}$ being independent of each other;

$R^{3a}$, $R^{3b}$: alkylene group(s) or bivalent substituent(s) that has ester linkage or ether linkage, $R^{3a}$, $R^{3b}$ being independent of each other;

n: integer between 5 and 200.)

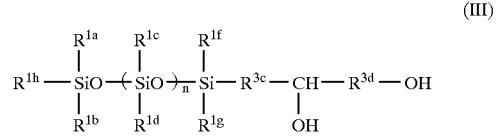

-continued

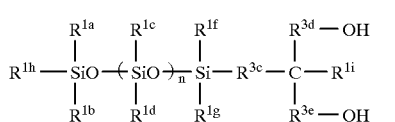

(IV)

(In the above formulae (III) and (IV), $R^{1a}$, $R^{1b}$, $R^{1c}$, $R^{1d}$, $R^{1f}$, $R^{1g}$, $R^{1h}$, $R^{1i}$, $R^{3c}$, $R^{3d}$, $R^{3e}$, and n are as follows:

$R^{1a}$–$R^{1d}$, $R^{1f}$–$R^{1i}$: alkyl or aryl groups each including 1–8 carbon(s); $R^{1a}$–$R^{1d}$, $R^{1f}$–$R^{1i}$ being independent of each other;

$R^{3c}$–$R^{3e}$: alkylene group(s) or bivalent substituent(s) having ester linkage or ether linkage, $R^{3c}$–$R^{3e}$ being independent of each other;

n: integer between 5 and 200.)

The silicone modified thermoplastic polyurethane resin according to the present invention is obtained by reacting polyether diol, polysiloxane diol obtained from polysiloxane compound and caprolactone, diisosyanate, and low-molecular diol of which the molecular weight is not more than 250.

The air bag of the present invention may be made of a resin composite of a silicone modified thermoplastic polyurethane resin and one or more resins selected from a group consisting of polyester elastomer, polyamide elastomer, and styrene elastomer. In this case, the content of siloxane of polysiloxane segment in the resin composite should be 5–40% by weight.

DESCRIPTION OF THE PREFERRED EMBODIMENT

Hereinafter, embodiments of the present invention will now be described.

As for an air bag made of silicone modified thermoplastic polyurethane resin of the present invention, when the content of siloxane in silicone modified thermoplastic resin or polysiloxane segment in resin composition of the air bag is less than 5% by weight, excessive expansion or burst can happen in inflation test at high temperature and the air bag becomes inferior about heat resistance. On the other hand, when the content of siloxane is more than 40% by weight, the durability becomes low and the melting viscosity becomes high whereby it is difficult to mold the air bag. Therefore, the content of siloxane in the resin or resin composition is 5–40% by weight, preferably 10–30% by weight.

The siloxane is represented by general formula such as the following formulae (V) and (VI).

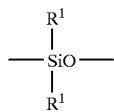

(V)

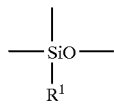

(VI)

$R_1$=alkyl group and/or aryl group with 1–8 carbon(s) (either the same type or different type may be employed)

The polysiloxane suitable for the present invention is polysiloxane that contains amino group, hydroxyl group, carboxyl group, and so on, as represented by the above formula (I). And more suitable polysiloxane is polysiloxane diol having two hydroxyl groups at the terminals, as represented by above the formula (II), (III), or (IV).

As for $R^{1a}$–$R^{1i}$ of the formulae (II)–(IV), methyl group, ethyl group, and octyl group are suitable for alkyl group, and phenyl group is suitable for aryl group.

Ethylene group, trimethylene group, 2-oxapentamethylene group, 3-oxahexamethylene group are suitable for $R^{3a}$–$R^{3e}$.

It is preferable that n is an integer in the range of 5–200, and that the average molecular weight is 500–20000.

Among the methods of synthesizing the above polysiloxane diol are a method comprising a step of reacting allyl glycol or the like in environment in which polyhydrogensiloxane and platinum catalyst exist, a method comprising a step of ring-opening polymerizing cyclic ether such as caprolactone and butyrolactone to siloxane containing alcoholic hydroxyl group, a method comprising a step of dehydrated-condensing diol in carboxylic acid modified siloxane.

Particularly, the polysiloxane diol as represented by the formula (II) is preferably a copolymer of polysiloxane including active hydrogen, such as hindered siloxane with 6-hydroxy-4-oxa-hexyl groups at both terminals, and caprolactone.

The polysiloxane diol as represented by the formula (III) is preferably a copolymer of siloxane including diol at one terminal, such as hindered siloxane with 6,7-dihydroxy-4-oxa-heptyl group at one terminal, and caprolactone.

The polysiloxane diol as represented by the formula (IV) is preferably a copolymer of siloxane with diol at one terminal, such as hindered siloxane with 6,6-bis(hydroxymethyl)-4-oxa-octyl group at one terminal, and caprolactone.

The silicone modified thermoplastic polyurethane resin according to the present invention is obtained by reacting polyol, polyisocyanate, polysiloxane, and, if necessary, chain extender.

Though high molecular polyol which is well known in the art may be employed as the polyol, the polyol is preferably the one of which the average molecular weight is 500–10000, for example, polyester polyol, polyether polyol, polycarbonate polyol, and polylactone polyol. Among such polyol are polyethylene adipate, polyethylene propylene adipate, polyethylene butylene adipate, polybutylene adipate, polyhexamethylene adipate, polydiethylene adipate, polyethylene succinate, polybutylene succinate, polyethylene sebacate, polybutylene sebacate, polypropylene glycol, polytetramethylene ether glycol, poly-ε-caprolactone diol, and polyhexamethylene carbonate. The polyol may be the one that includes a suitable amount of polyoxyethylene chain in any one of the above polyol.

Though the amount of the high molecular polyol is not limited particularly, the content of the high molecular polyol is preferably 5–40% by weight relative to all of the polyol (including diol as polysiloxane and low molecular diol as chain extender) in the material.

Though low molecular diol or low molecular diamine, which is well known in the art, may be employed as the chain extender, the chain extender is preferably low molecular diol the average molecular weight of which is not more than 250. Among such low molecular diol are ethylene glycol, propylene glycol, diethylene glycol, 1,4-butanediol, 1,6-hexanediol, and bis hydroxyethyl ether benzene.

Though the amount of the low molecular diol is not limited particularly, the content of the low molecular diol is preferably 5–30% by weight relative to all of the polyol.

Any material, which is well known in the art as the plyisocyanate, may be employed as the polyisocyanate. Among such materials are 4,4'-diphenylmethane diisocyanate (MDI), hydrogenated MDI, isophoronediisocyanate, 1,3-xylenediisocyanate, 1,4-xylenediisocyanate, 2,4-tolylenediisocyanate, 2,6-tolylenediisocyanate, 1,5-naphthalenediisocyanate, and m-phenylenediisocyanate, p-phenylenediisocyanate, and moreover, urethane polymer obtained by reacting one of the above organic polyisocyanate and low molecular polyol or polyamine to be terminal isocyanate.

In the synthesis of the silicone modified thermoplastic polyurethane resin, the ratio of the all polyol (including diol) to polyisocyanate in the material is preferably 0.90–1.15 at the NCO/OH equivalence ratio.

The silicone modified thermoplastic polyurethane resin according to the present invention can be made by using one of well-known synthesizing methods, for example, a method comprising a step of reacting parts of the polyol and parts or all of the isocyanate to synthesis prepolymer and a step of, after that, reacting the remaining polyol, and a method comprising a step of reacting the polyisocyanate to the polyol, the chain extender at the equivalent weights.

Though the following description shows typical properties of the silicone modified thermoplastic polyurethane resin according to the present invention, the present invention is not limited thereto.

Properties of Silicone Modified Thermoplastic Polyurethane Resin

Pour Point: 195–220° C.

Melting Viscosity: $0.1 \times 10^4$ Poises to $20 \times 10^4$ Poises (220° C.)

Hardness: 83–97

The values of the pour point and the melting viscosity are the results of measuring using a flow tester with a nozzle of 1 mm in diameter and 10 mm in length and a load 50 kgf/cm$^2$ at a programming rate 3° C./minute in accordance with JIS (Japanese Industrial Standard) K7311. The value of the hardness is the result of measuring in accordance with JIS K7311.

The silicone modified thermoplastic polyurethane resin may blend with one or more of other resins. In this case, the resins may be polyester elastomer, polyamide elastomer, styrene elastomer (SBS, SEBS, maleic acid modified SEBS, etc.), olefinic elastomer (EPR, EPDM, etc.), styrene resin (PS, HIPS, AS, ABS, AES, etc.), chlorine resin (PVC, chlorinated polyethylene, etc.), olefinic resin (PE, PP, EVA, etc.), ester resin, and amido resin.

The silicone modified thermoplastic polyurethane resin may also blend with one or more of well-known additives such as flame retardant, pigment, extender pigment, coloring agent, inorganic filler, organic filler, stabilizer, hydrolysis inhibitor, oxidation inhibitor, stabilizer to light, ultraviolet absorbent, lubricant, plasticizer, antistatic agent, surface active agent, cross linking agent, foaming agent, and defoaming agent.

In case where the silicone modified thermoplastic polyurethane resin blends with one or more of other resins, the blending should be made such that the blended resin has a content of siloxane of 5–40% by weight, preferably, 10–30% by weight.

In case of adding one or more of the above additives, it is preferable that the amount of the additive(s) is not more than 50% by weight to the resin.

One of methods manufacturing an air bag made of silicone modified thermoplastic polyurethane resin of the present invention is a method comprising a step of molding the silicone modified thermoplastic polyurethane resin or the resin composite of the silicone modified thermoplastic polyurethane resin of the present invention and the other resin(s) and/or the additive(s) by using a T-die into film- or sheet-like configurations, or by blow molding or injection molding extrusion to make intermediate products, and a step of bonding them together to form the air bag.

In typical cases, the air bag made of silicone modified thermoplastic polyurethane resin of the present invention is manufactured in such a manner that the thickness of the air bag is about 0.1–2.0 mm.

EXAMPLES AND COMPARATIVE EXAMPLES

The present invention will be described more concretely by the following examples and comparative examples. It should be noted that, unless otherwise mentioned, "parts" or "%" in the following description are represented by weight.

Example 1

Ester modified polysiloxane polyol (S1) having a content of siloxane of 60% by weight and the average molecular weight of 5200 was first obtained by copolymerization of alcohol modified siloxane oil (KF-6002; available from Shin-Etsu Chemical Co., Ltd.) and $\epsilon$-caprolactone. A silicone modified thermoplastic polyurethane resin (U1) was obtained by reacting, at 100° C., 324 parts of 1,4-butanediol and 1160 parts of 4,4'-diphenylmethanediisocyanate with 1000 parts of the aforementioned ester modified polysiloxane polyol (S1) and 1080 parts of polytetramethylene ether glycol of which the average molecular weight is 1700.

The content of siloxane in the obtained silicone modified thermoplastic polyurethane resin (U-1) is shown in Table 1.

A test piece was made of the silicone modified thermoplastic polyurethane resin (U-1) by injection molding. The mechanical properties of the test piece were measured according to JIS K7311 and the performance evaluation was made. The results are shown in Table 1.

The pour point and the melting were measured by using a flow tester with a nozzle of 1 mm in diameter and 10 mm in length and a load 50 kgf/cm$^2$ at a programming rate 3° C./minute in accordance with JIS K7311.

The dynamic modulus of elasticity was measured by using sheets of 0.4 mm thickness on a frequency of 30 Hz, at a programming rate 5° C./minute, and at an amplitude of 20 $\mu$m by a solid viscoelasticity measuring device.

The tackiness of sheets was measured by leaving six sheets of 0.4 mm thickness in the lapped state for 504 hours, with the pressurized surface of 50 mm×50 mm and a load of 35 gf/cm$^2$, at a temperature of 100±2° C. and, after that, separating the sheet from each other. The result was evaluated on the following bases:

x: Not separated at all;

Δ: Separated in part; and

○: Separated completely.

The inflation test was conducted with an air bag consisting of sheets of 100–600 $\mu$m thickness which were made of the sample by extrusion molding (T-die), at temperatures ranging from −40° C. to 100°C. The result was evaluated on the following bases:

x: Significantly damaged during deployment;

Δ: Slightly damaged during deployment; and

○: Not damaged during deployment.

Example 2

A silicone modified thermoplastic polyurethane resin (U2) was obtained by reacting, at 100° C., 181 parts of 1,4- butanediol and 581 parts of 4,4'-diphenylmethanediisocyanate with 1000 parts of ester modified polysiloxane polyol (S1), which was also employed in Example 1, and 100 parts of alcohol modified siloxane oil (KF-6002; available from Shin-Etsu Chemical Co., Ltd.) of which the average molecular weight is 3200.

The content of siloxane in the obtained silicone modified thermoplastic polyurethane resin (U-2) is shown in Table 1.

Also for the silicone modified thermoplastic polyurethane resin (U-2), the properties were measured and evaluated in the same manner as Example 1. The results are shown in Table 1.

Example 3

A silicone modified thermoplastic polyurethane resin (U3) was obtained by reacting, at 100° C., 725 parts of 1,4-butanediol and 2727 parts of 4,4'-diphenylmethanediisocyanate with 1000 parts of ester modified polysiloxane polyol (S1), which was also employed in Example 1, and 3800 parts of polytetramethylene ether glycol of which the average molecular weight is 1700. Also for the silicone modified thermoplastic polyurethane resin (U3), the properties were measured and evaluated in the same manner as Example 1. The results are shown in Table 1.

Comparative Example 1

A thermoplastic polyurethane resin (U4) was obtained by reacting, at 100° C., 151 parts of 1,4- butanediol and 589 parts of 4,4'-diphenylmethanediisocyanate with 1000 parts of polytetramethylene ether glycol of which the average molecular weight is 1700. Also for the thermoplastic polyurethane resin (U4), the properties were measured and evaluated in the same manner as Example 1. The results are shown in Table 1.

Comparative Example 2

A silicone modified thermoplastic polyurethane resin (U5) having a content of siloxane shown in Table 1 was obtained by reacting, at 100° C., 1179 parts of 1,4-butanediol and 4495 parts of 4,4'-diphenylmethanediisocyanate with 1000 parts of ester modified polysiloxane polyol (S1) and 6800 parts of polytetramethylene ether glycol of which the average molecular weight is 1700. Also for the silicone modified thermoplastic polyurethane resin (U5), the properties were measured and evaluated in the same manner as Example 1. The results are shown in Table 1.

Comparative Example 3

A silicone modified thermoplastic polyurethane resin (U6) having a content of siloxane shown in Table 1 was obtained by reacting, at 100° C., 280 parts of 1,4-butanediol and 914 parts of 4,4'-diphenylmethanediisocyanate with 1000 parts of ester modified polysiloxane polyol (S1), which was also employed in Example 1, and 700 parts of alcohol modified siloxane oil (KF-6002; available from Shin-Etsu Chemical Co., Ltd.) of which the average molecular weight is 3200. Also for the silicone modified thermoplastic polyurethane resin (U6), the properties were measured and evaluated in the same manner as Example 1. The results are shown in Table 1.

Example 4

Ester modified polysiloxane polyol (S2) having a content of siloxane of 65% by weight and the average molecular weight of 3000 was obtained by dehydrated-condensing polymerization of carboxyl modified siloxane oil (X-22-162A; available from Shin-Etsu Chemical Co., Ltd.) with 1,4-butanediol. A silicone modified thermoplastic polyurethane resin (U7) having a content of siloxane shown in Table 1 was obtained by reacting, at 100° C., 436 parts of 1,4-butanediol and 1620 parts of 4,4'-diphenylmethanediisocyanate with 1000 parts of the aforementioned ester modified polysiloxane polyol (S2). Also for the silicone modified thermoplastic polyurethane resin (U7), the properties were measured and evaluated in the same manner as Example 1. The results are shown in Table 1.

Comparative Example 4

A thermoplastic polyurethane resin (U8) was obtained by reacting, at 100° C., 151 parts of 1,4- butanediol and 518 parts of 4,4'-diphenylmethanediisocyanate with 1000 parts of hexamethylene adipate polyol of which the average molecular weight is 3200. Also for the silicone modified thermoplastic polyurethane resin (U8), the properties were measured and evaluated in the same manner as Example 1. The results are shown in Table 1.

Example 5

A silicone modified thermoplastic polyurethane resin composition (U9) having a content of siloxane shown in Table 1 was obtained by fusion mixing 100 parts of the silicone modified thermoplastic polyurethane resin (U1) of Example 1 and 20 parts of polyester elastomer (Herprene P80C; available from Touyoubou) by an extruder. Also for the thermoplastic polyurethane resin composition (U9), the properties were measured and evaluated in the same manner as Example 1. The results are shown in Table 1.

Example 6

A silicone modified thermoplastic polyurethane resin composition (U10) having a content of siloxane shown in Table 1 was obtained by fusion mixing 100 parts of the silicone modified thermoplastic polyurethane resin (U1) of Example 1 and 10 parts of polyamide elastomer (PAE1200; available from Ube Industries, Ltd.) by an extruder. Also for the silicone modified thermoplastic polyurethane resin composition (U10), the properties were measured and evaluated in the same manner as Example 1. The results are shown in Table 1.

Example 7

A silicone modified thermoplastic polyurethane resin composition (U11) having a content of siloxane shown in Table 1 was obtained by fusion mixing 100 parts of the silicone modified thermoplastic polyurethane resin (U1) of Example 1 and 20 parts of SEBS (styrene-ethylene-butylene-styrene) (Toughprene M1953; available from Asahikasei, hydrogenated SEBS) by an extruder. Also for the silicone modified thermoplastic polyurethane resin composition (U11), the properties were measured and evaluated in the same manner as Example 1. The results are shown in Table 1.

Comparative Example 5

A thermoplastic polyurethane resin composition (U12) was obtained by fusion mixing 100 parts of the thermoplastic polyurethane resin (U5) of Comparative Example 2 and 20 parts of polyester elastomer (Herprene P80C; available from Touyoubou) by an extruder. Also for the thermoplastic polyurethane resin composition (U12), the properties were measured and evaluated in the same manner as Example 1. The results are shown in Table 1.

Comparative Example 6

A thermoplastic polyurethane resin composition (U13) was obtained by fusion mixing 100 parts of the thermoplastic polyurethane resin (U5) of Comparative Example 2 and 20 parts of SEBS (Toughprene M1953; available from Asahikasei, hydrogenated SBS) by an extruder. Also for the thermoplastic polyurethane resin composition (U13), the properties were measured and evaluated in the same manner as Example 1. The results are shown in Table 1.

low temperatures because, in any of the above, the elasticity became large at low temperature so that it became hard and friable, the elasticity became low at high temperature so that it became soft, and furthermore the tackiness of sheets was large. Accordingly, the resins (U4, U8) and the resin composition (U12, U13) are not suitable for use as materials of air bags.

The silicone modified thermoplastic polyurethane resin (U6) of Comparative Example 3 had low strength so that it was damaged at both high and low temperatures. Accordingly, the resin (U6) is not suitable for use as a material of air bags.

As apparent from the above description, the air bag made of silicone modified thermoplastic polyurethane resin of the

| Example | Resin | Content of Siloxane (wt %) | Hardness (JIS A) | 100% modulus (kg/cm²) | Tensile Strength (kg/cm²) | Elongation (%) | Dynamic Modulus of Elasticity (dyn/cm²) −40° C. | Dynamic Modulus of Elasticity (dyn/cm²) +100° C. | Pour Point (° C.) | Melting Viscosity (poise/ 220° C.) | Tackiness | Temperatures for Inflation Test of Air Bag (° C.) −40 | −30 | 90 | 100 |
|---|---|---|---|---|---|---|---|---|---|---|---|---|---|---|---|
| Example 1 | U1 | 17 | 90 | 84 | 251 | 515 | 7.1 × 10⁹ | 2.6 × 10⁸ | 215 | 2.5 × 10⁴ | ○ | ○ | ○ | ○ | ○ |
| Example 2 | U2 | 37 | 89 | 81 | 196 | 326 | 5.5 × 10⁹ | 2.5 × 10⁸ | 213 | 2.4 × 10⁴ | ○ | ○ | ○ | ○ | ○ |
| Example 3 | U3 | 7 | 91 | 86 | 423 | 468 | 1.1 × 10¹⁰ | 7.6 × 10⁷ | 196 | 0.8 × 10⁴ | Δ | X | ○ | ○ | Δ |
| Comparative Example 1 | U4 | 0 | 90 | 78 | 455 | 452 | 1.2 × 10¹⁰ | 7.9 × 10⁷ | 198 | 0.7 × 10⁴ | X | X | X | X | X |
| Comparative Example 2 | U5 | 4 | 89 | 76 | 436 | 485 | 1.0 × 10¹⁰ | 7.8 × 10⁷ | 195 | 0.6 × 10⁴ | X | X | X | X | X |
| Comparative Example 3 | U6 | 44 | 88 | 75 | 118 | 241 | 5.9 × 10⁹ | 2.8 × 10⁸ | 217 | 2.9 × 10⁴ | ○ | X | X | X | X |
| Example 4 | U7 | 13 | 93 | 81 | 155 | 473 | 6.0 × 10⁹ | 1.7 × 10⁸ | 209 | 2.1 × 10⁴ | ○ | ○ | ○ | ○ | ○ |
| Comparative Example 4 | U8 | 0 | 92 | 76 | 384 | 506 | 1.2 × 10¹⁰ | 9.7 × 10⁸ | 182 | 0.1 × 10⁴ | X | X | X | X | X |
| Example 5 | U9 | 14 | 90 | 85 | 262 | 532 | 5.8 × 10⁹ | 3.4 × 10⁸ | 218 | 2.6 × 10⁴ | ○ | ○ | ○ | ○ | ○ |
| Example 6 | U10 | 15 | 91 | 89 | 272 | 497 | 6.8 × 10⁹ | 3.1 × 10⁸ | 220 | 2.7 × 10⁴ | ○ | ○ | ○ | ○ | ○ |
| Example 7 | U11 | 14 | 89 | 78 | 223 | 568 | 3.6 × 10⁹ | 1.5 × 10⁸ | 206 | 1.8 × 10⁴ | ○ | ○ | ○ | ○ | ○ |
| Comparative Example 5 | U12 | 4 | 90 | 82 | 412 | 438 | 1.0 × 10¹⁰ | 2.5 × 10⁷ | 197 | 0.8 × 10⁴ | X | X | X | X | X |
| Comparative Example 6 | U13 | 4 | 90 | 83 | 387 | 427 | 5.7 × 10⁹ | 2.9 × 10⁷ | 191 | 0.4 × 10⁴ | X | X | X | X | X |

Table 1 clearly indicates as follows.

It is apparent from the results of inflation tests that the silicone modified thermoplastic polyurethane resins (U1, U2, U7) and the silicone modified thermoplastic polyurethane resin composition (U9, U10, U11) of Examples 1–7 (except Example 3), of which each content of siloxane is in the best range between 10 and 40% by weight as claimed in claims were not damaged over temperature ranging from −40° C. to +100° C. because, in any of the above, the change in modulus of elasticity with temperature ranging from very low to high was small, the strength at normal temperature was sufficient, and the tackiness of sheets was small. Accordingly, the resins (U1, U2, U7) and the resin composition (U9, U10, U11) are suitable for use as materials of air bags.

The silicone modified thermoplastic polyurethane resin (U3) of Example 3 of which the content of siloxane is 7% by weight in a range of claims was slightly damaged at −40° C. and 100° C. but did not break at −30° C. and 90° C. Accordingly, the resin (U3) has serviceability suitable for use as a material of air bags.

The thermoplastic polyurethane resins (U4, U8), the silicone modified thermoplastic polyurethane resin (U5), and the silicone modified thermoplastic polyurethane resin composition (U12, U13) of Comparative Examples 1–6 (except Comparative Example 3) were damaged at both high and present invention can sufficiently protect an occupant over a range from very low temperature to high temperature, such as from −40° C. to +100° C., without danger of blocking.

What is claimed is:

1. An air bag made of silicone modified thermoplastic polyurethane resin containing polysiloxane segment, said silicone modified thermoplastic polyurethane resin being characterized in that the content of siloxane of the polysiloxane segment is 5–40% by weight.

2. An air bag made of silicone modified thermoplastic polyurethane resin as claimed in claim 1, wherein said air bag is made of a resin composition of a silicone modified thermoplastic polyurethane resin containing polysiloxane segment and one or more resins selected from a group consisting of polyester elastomer, polyamide elastomer, and styrene elastomer, and the content of siloxane of said polysiloxane segment in said resin composition being 5–40% by weight.

3. An air bag made of silicone modified thermoplastic polyurethane resin as claimed in claim 1, wherein said silicone modified thermoplastic polyurethane resin is the one obtained by reacting polyol, polyisocyanate, polysiloxane, and, if necessary, chain extender and wherein said polysiloxane is polysiloxane including active hydrogen as represented by the following general formula (I);

(I)

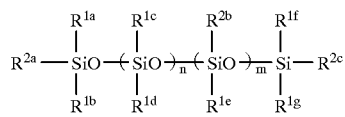

(In the above formula (I), $R^{1a}$, $R^{1b}$, $R^{1c}$, $R^{1d}$, $R^{1e}$, $R^{1f}$, $R^{1g}$, $R^{2a}$, $R^{2b}$, $R^{2c}$, m, and n are as follows:

$R^{1a}$–$R^{1g}$: aryl or alkyl groups each including 1–8 carbon(s), $R^{1a}$–$R^{1g}$ being independent of each other;

$R^{2a}$–$R^{2c}$: substituents each including active hydrogen, or aryl or alkyl groups each including 1–8 carbon(s), $R^{2a}$–$R^{2c}$ being independent of each other, and at least one of $R^{2a}$–$R^{2c}$ being the substituent including active hydrogen;

m: integer between 0 and 2;

n: integer between 5 and 200.).

4. An air bag made of silicone modified thermoplastic polyurethane resin as claimed in claim 3, wherein said polysiloxane is polysiloxane diol as represented by the following general formula (II);

(II)

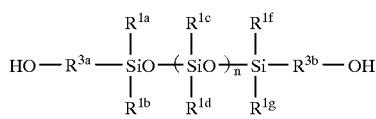

(In the above formula (II), $R^{1a}$, $R^{1b}$, $R^{1c}$, $R^{1d}$, $R^{1f}$, $R^{1g}$, $R^{3a}$, $R^{3b}$, and n are as follows:

$R^{1a}$–$R^{1d}$, $R^{1f}$, $R^{1g}$: alkyl or aryl groups each including 1–8 carbon(s), $R^{1a}$–$R^{1d}$, $R^{1f}$, $R^{1g}$ being independent of each other;

$R^{3a}$, $R^{3b}$: alkylene group(s) or bivalent substituent(s) that has ester linkage or ether linkage, $R^{3a}$, $R^{3b}$ being independent of each other;

n: integer between 5 and 200).

5. An air bag made of silicone modified thermoplastic polyurethane resin as claimed in claim 3, wherein said polysiloxane is polysiloxane diol as represented by the following general formula (III) or (IV);

(III)

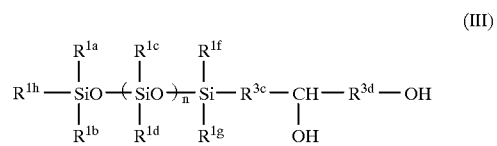

(IV)

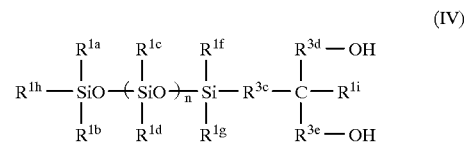

(In the above formulae (III) and (IV), $R^{1a}$, $R^{1b}$, $R^{1c}$, $R^{1d}$, $R^{1f}$, $R^{1g}$, $R^{1h}$, $R^{1i}$, $R^{3c}$, $R^{3d}$, $R^{3e}$, and n are as follows:

$R^{1a}$–$R^{1d}$, $R^{1f}$–$R^{1i}$: alkyl or aryl groups each including 1–8 carbon(s); $R^{1a}$–$R^{1d}$, $R^{1f}$–$R^{1i}$ being independent of each other;

$R^{3c}$–$R^{3e}$: alkylene group(s) or bivalent substituent(s) having ester linkage or ether linkage, $R^{3c}$–$R^{3e}$ being independent of each other;

n: integer between 5 and 200).

6. An air bag made of silicone modified thermoplastic polyurethane resin as claimed in claim 4, wherein said polysiloxane diol is a copolymer of polysiloxane including active hydrogen and caprolactone.

7. An air bag made of silicone modified thermoplastic polyurethane resin as claimed in claim 4, wherein said polysiloxane diol is a copolymer of carboxylic acid modified polysiloxane and diol.

8. An air bag made of silicone modified thermoplastic polyurethane resin as claimed in claims 1, wherein said polyurethane resin is obtained by reacting polyether diol, polysiloxane diol obtained from polysiloxane compound and caprolactone, diisosyanate, and low-molecular diol of which the molecular weight is not more than 250.

* * * * *